(12) United States Patent
Singh

(10) Patent No.: US 12,443,736 B2
(45) Date of Patent: Oct. 14, 2025

(54) SYSTEM AND METHOD FOR CONTROLLING GENERATIVE ARTIFICIAL INTELLIGENCE OUTPUT BASED ON USER ENTITLEMENTS

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 246 days.

(21) Appl. No.: 18/452,671

(22) Filed: Aug. 21, 2023

(65) Prior Publication Data

US 2025/0068754 A1  Feb. 27, 2025

(51) Int. Cl.
  *G06F 21/62* (2013.01)
  *G06F 21/32* (2013.01)

(52) U.S. Cl.
  CPC .......... *G06F 21/6218* (2013.01); *G06F 21/32* (2013.01)

(58) Field of Classification Search
  CPC ...... G06F 21/6218; G06F 21/31; G06F 21/32; G06F 16/9535; G06F 16/335; G06F 16/435; H04L 63/08; H04L 63/10; H04L 63/105
  USPC ........................................ 726/27, 28, 29, 30
  See application file for complete search history.

(56) References Cited

U.S. PATENT DOCUMENTS

| | | | |
|---|---|---|---|
| 5,731,805 A | 3/1998 | Tognazzini et al. | |
| 6,529,209 B1 | 3/2003 | Dunn et al. | |
| 6,918,039 B1 | 7/2005 | Hind et al. | |
| 7,209,557 B2 | 4/2007 | Lahiri | |
| 7,694,148 B2 | 4/2010 | Cheng et al. | |
| 7,978,929 B2 | 7/2011 | Kim et al. | |
| 8,462,949 B2 | 6/2013 | Anderson et al. | |
| 8,635,701 B2 * | 1/2014 | Hilaiel | G06F 21/53 713/193 |
| 9,177,070 B2 * | 11/2015 | McFarlane | G06F 3/0481 |
| 9,349,021 B1 * | 5/2016 | Chaganti | G16H 10/60 |
| 9,779,474 B2 | 10/2017 | Kominar | |
| 11,042,649 B1 | 6/2021 | John et al. | |
| 11,615,205 B2 | 3/2023 | Singh | |

(Continued)

OTHER PUBLICATIONS

NPL Search Terms (Year: 2025).*
Krause D. Mitigating risks for financial firms using generative AI tools. Available at SSRN 4452600. May 18, 2023 (Year: 2023).*

*Primary Examiner* — Syed A Zaidi

(57) ABSTRACT

The present disclosure provides a method. The method includes receiving a request from a user to generate content using generative artificial intelligence based on an original prompt having a first specific parameter and a second specific parameter. The method includes determining an authority level of the user and determining an authority level of the first specific parameter and the second specific parameter. The method includes determining whether the user is authorized to access the first specific parameter and the second specific parameter based on the authority level of the user. The method includes modifying the first specific parameter into a first generalized parameter and modifying the second specific parameter into a second generalized parameter. The method includes creating a modified prompt to generate the content using the generative artificial intelligence, wherein the modified prompt obfuscates the content of the original prompt using the first and second generalized parameter.

20 Claims, 2 Drawing Sheets

(56) References Cited

U.S. PATENT DOCUMENTS

| | | |
|---|---|---|
| 2002/0113912 A1 | 8/2002 | Wright et al. |
| 2003/0105719 A1 | 6/2003 | Berger et al. |
| 2005/0066165 A1 | 3/2005 | Peled et al. |
| 2006/0247919 A1 | 11/2006 | Specht et al. |
| 2007/0150827 A1 | 6/2007 | Singh et al. |
| 2013/0091214 A1* | 4/2013 | Kellerman ............ G06Q 10/00 709/204 |
| 2013/0091582 A1* | 4/2013 | Chen ................. H04N 21/8358 726/26 |
| 2013/0167207 A1* | 6/2013 | Davis .................... G06F 21/316 726/5 |
| 2018/0114593 A1* | 4/2018 | Akin ...................... G16H 10/20 |
| 2019/0281095 A1* | 9/2019 | Ein-Gil ................... H04L 67/14 |
| 2021/0232599 A1* | 7/2021 | Rabin ....................... G06F 9/54 |
| 2022/0392452 A1* | 12/2022 | Gupta ..................... G06F 21/32 |
| 2024/0296314 A1* | 9/2024 | Singh ................. G06F 16/2471 |

\* cited by examiner

SYSTEM AND METHOD FOR CONTROLLING GENERATIVE ARTIFICIAL INTELLIGENCE OUTPUT BASED ON USER ENTITLEMENTS

TECHNICAL FIELD

This disclosure relates generally to network communications and information security. More particularly, this disclosure relates to a system and method for controlling generative artificial intelligence output based on user entitlements.

BACKGROUND

Generative artificial intelligence is a type of technology that can produce various types of content, such as text, imagery, audio, and synthetic data. There are various types of chat-based generative AI applications that use prompts to produce content.

SUMMARY

The systems and methods described in the present disclosure provide practical applications and technical advantages that overcome the current technical problems described herein. Currently, there is no mechanism where the output of generative artificial intelligence (AI) can be controlled in such a way that the output content generated is obfuscated based on user entitlements. For example, an entity that utilizes generative AI may allow the generative AI to access parameters (e.g., text, images, video, audio, computer code, etc.) within the entity's database to generate content. However, certain entities may want to restrict which users have access to certain parameters on the database to ensure the content generated by the generative AI meets data security requirements. The provided system and method are integrated into the practical application of regulating the content generated from generative AI based on authority levels of a user. For example, the provided system includes a processor that receives a request from the user to generate content using generative AI based on an original prompt provided by the user. The original prompt includes one or more specific parameter that is input by the user. Suitable specific parameters may include, but are not limited to, text (e.g., one or more words or word tokens), image data (e.g., captioned text associated with an image), an audio waveform (e.g., recorded music, speech, etc.), video data (e.g., captioned text associated with a video), and computer code (e.g., programming language text). The processor determines an authority level of the user and an authority level of the one or more specific parameter in the original prompt. The processor then compares the authority level of the user to the authority level of the one or more specific parameter to determine whether the user is authorized to access the one or more specific parameter. If the user is authorized to access the one or more specific parameter, the processor is configured to generate the content using the original prompt provided by the user. If the user is not authorized to access the one or more specific parameter, the processor is configured to modify the specific parameter into one or more generalized parameter, and create a modified prompt to generate the content using the generative AI using the one or more generalized parameter. The modified prompt is configured to obfuscate the content of the original prompt using the one or more generalized parameter. For example, the obfuscated content may be toned down, generalized, masked, and/or filtered such that the original content is not provided to the unauthorized user. In some instances, the system includes a biometric device (e.g., a camera) configured to identify a plurality of users using one or more biometric parameters. For example, the biometric device may be a camera configured to acquire an image of the plurality of users positioned in front of a display, and the system may identify the plurality of users based on facial recognition parameters. Once the plurality of users are identified, the system may determine an authority level for each of the plurality of users, and modify the original prompt to create a modified prompt with one or more generalized parameter associated with a user in the plurality of users having the lowest authority level.

The disclosed systems and methods provide several practical applications and technical advantages. First, the disclosed systems and methods provide improved data security by regulating the content generated from generative AI based on authority levels of one or more users that create the original prompt. Regulating the content generated from generative AI to obfuscate generated content based on user authority levels provides the practical application of mitigating, or otherwise preventing, data security issues where users without proper authority levels may access confidential data or information on an institution's server, thereby improving network security. Second, the provided systems and methods may provide real-time identification of a plurality of users and a process for efficiently obfuscating confidential information from displaying on the display screen from viewers unauthorized to view the confidential information.

In some embodiments, the present disclosure provides a system. The system comprises a memory operably configured to store a user profile comprising an authority level of a user and a parameter profile comprising authority levels for a plurality of specific parameters. The system further comprises a processor operably coupled to the memory and configured to receive a request from the user to generate content using generative artificial intelligence based on an original prompt provided by the user, wherein the original prompt comprises a first specific parameter and a second specific parameter. The processor is further configured to determine the authority level of the user based at least in part upon information stored in the user profile of the user. The processor is further configured to determine an authority level of the first specific parameter based upon information stored in the parameter profile, and determine an authority level of the second specific parameter based upon information stored in the parameter profile. The processor is further configured to compare the authority level of the first specific parameter and the authority level of the second specific parameter to the authority level of the user, and determine whether the user is authorized to access the first specific parameter and the second specific parameter based on the authority level of the user. The processor is further configured to modify the first specific parameter into a first generalized parameter if the user is not authorized to access the authority level of the first specific parameter, and modify the second specific parameter into a second generalized parameter if the user is not authorized to access the authority level of the second specific parameter. The processor is configured to create a modified prompt to generate the content using the generative artificial intelligence, wherein the modified prompt obfuscates the content of the original prompt using the first generalized parameter if the user is not authorized to access the first specific parameter, and wherein the modified prompt obfuscates the content of the original prompt using the second generalized parameter if the user is not authorized to access the second specific parameter.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, there is no current mechanism where the output of generative AI can be controlled in such a way that the output content generated is obfuscated based on user entitlements. For example, an entity that utilizes generative AI may allow the generative AI to access parameters (e.g., text, images, video, audio, computer code, etc.) within the entity's database to generate content. However, certain entities may want to restrict which users have access to certain parameters on the database to ensure the content generated by the generative AI meets data security requirements. In some embodiments, the provided systems and methods regulate the content generated from generative AI based on authority levels of one or more user.

System Overview

Figure 1:
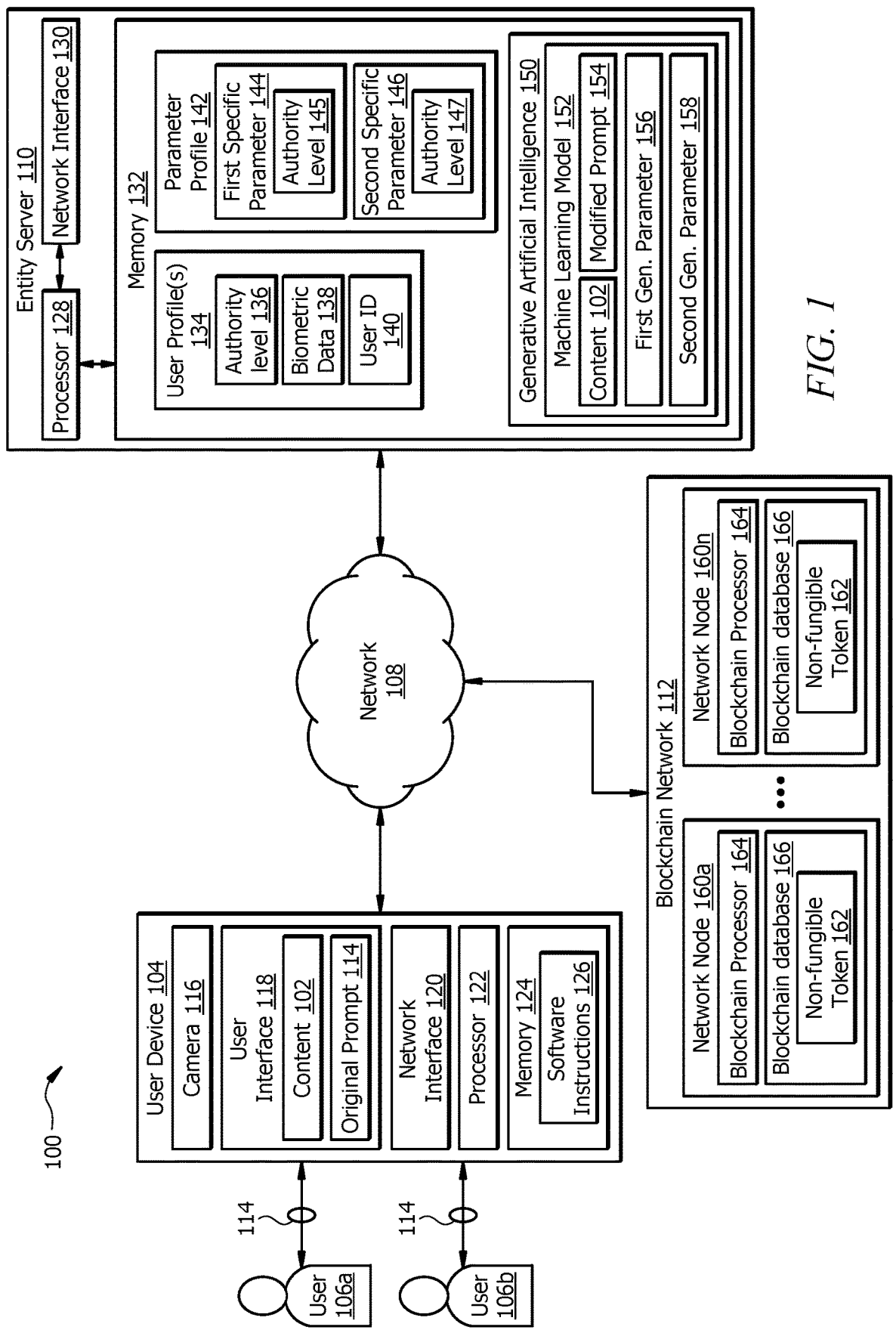
FIG. 1 illustrates a system according to an embodiment of the present disclosure.

FIG. 1 illustrates a system 100 for regulating content 102 generated from generative AI 150. In some embodiments, the system 100 comprises a user device 104 operable to interact with one or more user 106a, 106b, a network 108, an entity server 110, and a blockchain network 112. In general, the entity server 110 may receive a request from the user device 104 to generate content 102 using generative AI 150 based on an original prompt 114 provided by the user device 104. The user 106a may generate the original prompt 114 by inputting one or more specific parameter (e.g., a first specific parameter 144, a second specific parameter 146, etc.) to the user device 104. The user device 104 then communicates the original prompt 114 to the entity server 110 to generate content 102. Once the entity server 110 receives the original prompt 114, the entity server 110 determines an authority level 136 of the user 106a based at least in part upon information stored in a user profile 134. The entity server 110 is configured to determine an authority level 145 of the first specific parameter 144 and an authority level 147 of the second specific parameter 146 based on information stored in a parameter profile 142. The entity server 110 is configured to compare the authority level 145 of the first specific parameter 144 and the authority level 147 of the second specific parameter 146 to the authority level 136 of the user 106a. The entity server 110 is configured to determine whether the user 106a is authorized to access the first specific parameter 144 and the second specific parameter 146 based on the authority level 136 of the user 106a. The entity server 110 is configured to modify the first specific parameter 144 into a first generalized parameter 156 if the user 106a is not authorized to access the authority level 145 of the first specific parameter 144, and is configured to modify the second specific parameter 146 into a second generalized parameter 158 if the user 106a is not authorized to access the authority level 147 of the second specific parameter 146. The entity server 110 is configured to create a modified prompt 154 to generate the content 102 using the generative AI 150. The modified prompt 154 obfuscates the content 102 of the original prompt 114 using the first generalized parameter 156 if the user 106a is not authorized to access the first specific parameter 144, and the modified prompt 154 obfuscates the content 102 of the original prompt 114 using the second generalized parameter 158 if the user 106a is not authorized to access the second specific parameter 146.

System Components of FIG. 1

User Device

User device 104 is generally any device configured to interact with a user 106a and configured to receive one or more specific parameter 144, 146 from the user 106a. For example, the user device 104 may be a mobile phone, a smartphone, an electronic tablet device, or a computer (e.g., personal computer, desktop, workstation, laptop). In some embodiments, the user device 104 is in signal communication with an entity server 110 via network 108. The user device 104 may include a user interface 118. The user interface 118 may include a display for displaying the content 102 and the original prompt 114. The user interface 118 may optionally include other terminal equipment that allows the user 106a to interact with the user device 104, which may include, but is not limited to, a mouse, a touchscreen, a keyboard, and the like. In some embodiments, the user device 104 includes a camera 116. The camera 116 is configured to acquire an image of the one or more users 106a, 106b positioned in front of the user interface 118. The camera may be programmed to focus on the faces of each of the users 106a, 106b to identify each user 106a, 106b.

The user device 104 may include a network interface 120, a processor 122, and a memory 124. The network interface 120 is configured to enable wired and/or wireless communications between the network 108 and the user device 104, as well as other components in the system 100. Suitable network interfaces 120 include an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The network interface 120 may be configured to use any suitable type of communication protocol as would be appreciated by one of ordinary skill in the art.

The processor 122 of the user device 104 is configured to send and receive data using the network interface 120. The processor 122 is operatively coupled to the memory 124. The memory 124 may be a non-transitory computer readable medium. For example, the memory 124 may be volatile or non-volatile and may comprise a read-only memory (ROM), random-access memory (RAM), ternary content-addressable memory (TCAM), dynamic random-access memory (DRAM), and static random-access memory (SRAM). The memory 124 may be implemented using one or more disks, tape drives, solid-state drives, and/or the like. The memory 124 is operable to store software instructions 126. The software instructions 126 may comprise any suitable set of instructions, logic rules or code operable to execute the processor 122 to perform the operations of the user device 104 described herein. In particular, the software instructions 126 may include code for allowing the user 106a to input one or more specific parameter 144, 146 to the user device 104 in order to generate the original prompt 114. In general, the original prompt 114 may comprise any input data, a text command, or question that is provided to the generative AI 150 to generate the content 102. Suitable specific parameters 144, 146 may include, but are not limited to, text (e.g., one or more words or word tokens), image data (e.g., captioned text associated with an image), an audio waveform (e.g., recorded music, speech, etc.), video data (e.g., captioned text associated with a video), and computer code (e.g., programming language text).

The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 122 may be implemented in cloud devices, servers, virtual machines, and the like. The processor 122 may be a programmable logic device, a microcontroller, a microprocessor, or any suitable combination of the preceding. The processor 122 is configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, registers the supply operands to the ALU and store the results of ALU operations, and a control unit that fetches instructions from memory 124 and executes them by directing the coordinated operations of the ALU, registers and other components. The processor 122 is configured to implement various instructions described herein. For example, the processor 122 is configured to execute instructions from the memory 124 (e.g., software instructions 126) to implement the functions of the processor 122. In this way, processor 122 may be a special-purpose computer designed to implement the functions disclosed herein. In an embodiment, the processor 122 is implemented using logic units, FPGAs, ASICs, DSPs, or any other suitable hardware.

Network

Network 108 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 108 may be configured to support any suitable type of communication protocol as would be appreciated by one of ordinary skill in the art. In some embodiments, the network 108 facilitates the transfer of data between the user device 104, the entity server 110, and the blockchain network 112.

Entity Server

The entity server 110 comprises a processor 128 operably coupled with a network interface 130 and a memory 132. The processor 128 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 128 may be a programmable logic device, a microcontroller, a microprocessor, or any suitable number and combination of the preceding. The one or more processors are configured to process data and may be implemented in hardware or software. For example, the processor 128 may be 8-bit, 16-bit, 32-bit, 64-bit, or of any other suitable architecture. The processor 128 may include an arithmetic logic unit (ALU) for performing arithmetic and logic operations. The processor 128 may register the supply operands to the ALU and store the results of ALU operations. The processor 128 may further include a control unit that fetches instructions from memory and executes them by directing the coordinated operations of the ALU, registers, and other components. The one or more processors are configured to implement various software instructions. In this way, processor 128 may be a special-purpose computer designed to implement the functions disclosed herein. In an embodiment, the processor 128 is implemented using logic units, FPGAs, ASICs, DSPs, or any other suitable hardware. The processor 128 is configured to operate as described in FIGS. 1-2. For example, the processor 128 may be configured to perform one or more operations of the operational flow 200 as described in FIG. 2.

The network interface 130 configured to enable wired and/or wireless communications between the entity server 110 and the network 108, as well as other components in the system 100. Suitable network interfaces 130 include an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The network interface 130 may be configured to use any suitable type of communication protocol as would be appreciated by one of ordinary skill in the art.

The memory 132 may be volatile or non-volatile and may comprise read-only memory (ROM), random-access memory (RAM), ternary content-addressable memory (TCAM), dynamic random-access memory (DRAM), and static random-access memory (SRAM). The memory 132 may include one or more of a local database, cloud database, network-attached storage (NAS), etc. The memory 132 comprises one or more disks, tape drives, or solid-state drives, and may be used as an over-flow data storage device, to store programs when such programs are selected for execution, and to store instructions and data that are read during program execution. The memory 132 may store any of the information described in FIGS. 1-2 along with any other data, instructions, logic, rules, or code operable to implement the function(s) described herein when executed by processor 128.

The memory 132 may store one or more user profile 134. In some embodiments, the user profile 134 is configured to store an authority level 136 for the one or more users 106a. In some embodiments, the authority level 136 of the user 106a indicates whether the user 106a is authorized to view the one or more specific parameters 144, 146 stored in a parameter profile 142. For example, the authority level 136 of the user 106a may depend on their respective job level within the entity. In some embodiments, an executive position will have a higher authority level 136, which allows the executive position to have the authority to access a greater number of specific parameters 144, 146 from the parameter profile 142 relative to an intermediate position or an entry position. That is, each of the intermediate position and the entry position may have a lower authority level 136 compared to the executive position (i.e., the intermediate position and entry position have the authority to access less specific parameters 144, 146 compared to the executive position). In some embodiments, the authority level 136 of the user 106*a* may be compared to an authority level 145 of the specific parameter 144 to determine if the user 106*a* is authorized to access the specific parameter 144 based on the authority level 136 of the user 106*a*. In some embodiments, the authority level 136 of the user 106*a* and the authority level 145 of the specific parameter 146 may each be assigned a respective numerical value. In one example, if the numerical value corresponding to the authority level 136 of the user 106*a* meets a threshold value then the user 106*a* is authorized to access the specific parameter 146. For example, if the numerical value for the authority level 136 of the user 106*a* is greater the numerical value for the authority level 145 of the specific parameter 146, then the user 106*a* is authorized to access the specific parameter 146.

In some embodiments, the user profile 134 is configured to store biometric data 138 and a user identification (ID) 140 of the one or more users 106*a*. In some embodiments, the biometric data 138 includes known photographic properties for users having a user ID 140 within the entity. The entity server 110 may identify the one or more users 106*a*, 106*b* using the biometric data 138. For example, the entity server 110 may receive an image of the one or more users 106*a* from the camera 116. The entity server 110 may then compare photographic properties (e.g., feature vectors of the user's face) to the biometric data 138 stored in the user profile 134. If there is a match, the entity server 110 may identify the user 106*a* to the user ID 140.

In some embodiments, the memory 132 may store the generative AI 150. In some embodiments, the generative AI 150 includes a machine learning module 152. The machine learning module 152 may be implemented by the processor 128, and is generally configured to create a modified prompt 154 that is used to generate the content 102. Exemplary content 102 may include, but is not limited to, text, computer code, images, music, video, and the like. In general, the modified prompt 154 obfuscates the content 102 of the original prompt 114 if the user is not authorized to access the one or more specific parameters 144, 146. For example, if the entity server 110 determines that the user 106*a* is not authorized to access the first specific parameter 144, then the machine learning module 152 modifies the first specific parameter 144 into a first generalized parameter 156. Similarly, if the entity server 110 determines that the user 106*a* is not authorized to access a second specific parameter 146, then the machine learning module 152 modifies the second specific parameter 146 into a second generalized parameter 158. The first generalized parameter 156 and the second generalized parameter 158 are then used to create the modified prompt 154, which is configured to obfuscate the content 102 of the original prompt 114. Further details of the process are explained in FIG. 2.

In some embodiments, the machine learning module 152 may include a support vector machine, neural network, random forest, k-means clustering, Tree-based algorithm, Random Forest algorithm, etc. In certain embodiments, the machine learning module 152 may include text processing, NLP algorithms, text-to-image algorithms, text-to-video algorithms, text-to-audio algorithms, text-to-music algorithms, and the like. In certain embodiments, the machine learning module 152 may be implemented by a plurality of neural network layers, convolutional neural network layers, LSTM layers, Bi-directional LSTM layers, recurrent neural network layers, transformer-based deep neural networks, and the like. The machine learning module 152 may be implemented by supervised, semi-supervised, or unsupervised training algorithms. The machine learning module 152 may be trained with a training dataset that comprises one or more specific parameters 144, 146 stored in the parameter profile 142. The training dataset may include previous text (e.g., one or more words or word tokens), image data (e.g., captioned text associated with an image), audio waveforms (e.g., recorded music, speech, etc.), video data (e.g., captioned text associated with a video), and computer code (e.g., programming language text) from previous prompts.

Blockchain Network

Blockchain network 112 is a peer-to-peer network of network nodes 160(*a*)-(*n*), and is generally configured to distribute data from the user profile 134 as a non-fungible token 162 among the network nodes 146(*a*)-(*n*). The non-fungible token 162 is a unique digital identifier that is recorded on the blockchain network 112. In some embodiments, the blockchain network 112 is a distributed database in a network of network nodes 160(*a*)-(*n*). In some embodiments, blockchain network 112 may be a public blockchain network. In some embodiments, blockchain network 112 may be a private blockchain network. For example, membership in the blockchain network 112 may be limited to nodes registered as belonging to and/or affiliated with the organization to which the network 108 belongs.

The blockchain network 112 may comprise any number of network nodes 160(*a*)-(*n*) to form a distributed network that maintains a blockchain 168. Each network node 160(*a*)-(*n*) may comprise a computing device, a virtual machine, a server, a workstation, and/or the like. Each network node 160(*a*)-(*n*) of the blockchain network 112 stores a blockchain database 166 that is configured to store a copy of the blockchain 168. Each network node may include a blockchain processor 164 configured to perform any of the functions or actions of the network node 160(*a*)-(*n*) described herein. The blockchain processor 164 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the blockchain processor 164 may be implemented in cloud devices, servers, virtual machines, and the like. The blockchain processor 164 may be a programmable logic device, a microcontroller, a microprocessor, or any suitable combination of the preceding. The blockchain processor 164 is configured to process data and may be implemented in hardware or software. For example, the blockchain processor 164 may be 8-bit, 16-bit, 32-bit, 64-bit, or of any other suitable architecture. The blockchain processor 164 may include an arithmetic logic unit (ALU) for performing arithmetic and logic operations, registers the supply operands to the ALU and store the results of ALU operations, and a control unit that fetches instructions from the blockchain database 166 and executes them by directing the coordinated operations of the ALU, registers and other components. The blockchain processor 164 is configured to implement various instructions described herein. In this way, blockchain processor 164 may be a special-purpose computer designed to implement the functions disclosed herein. In an embodiment, the blockchain processor 164 is implemented using logic units, FPGAs, ASICs, DSPs, or any other suitable hardware. In some embodiments, the blockchain network 112 communicates with the processor 128 via network interface 130.

In some embodiments, the blockchain processor 164 is configured to establish consensus among the network nodes 160(*a*)-(*n*) about the present state of the blockchain database 166. For example, the blockchain processor 164 may communicate with each respective network node 160(*a*)-(*n*) to implement a consensus protocol procedure through which all the network nodes 160(*a*)-(*n*) of the blockchain network 112 reach a common agreement about the present state of the blockchain database 166. In this way, each network node 160(*a*)-(*n*) achieves reliability in the blockchain network 112 and establishes trust between the network nodes 160(*a*)-(*n*) in a distributed computing environment. Essentially, the consensus protocol makes sure that every new block that is added to the blockchain 168 is the one and only version of the truth that is agreed upon by all the blocks in the blockchain 168. Blockchain 168 links together blocks of data, which store identifiable units called blockchain data entries. The blockchain data entry may be interchangeably referred to herein as a blockchain data entry. The blockchain data entries stored in the blockchain 168, may include information, files, and/or any other suitable type of data. For example, blockchain data entries may include data from the user profile 134 (e.g., authority level 136 of the one or more users 106*a*, biometric data 138, and user ID 140 of the one or more users 106*a*) stored as a non-fungible token 162.

System Operation

Figure 2:
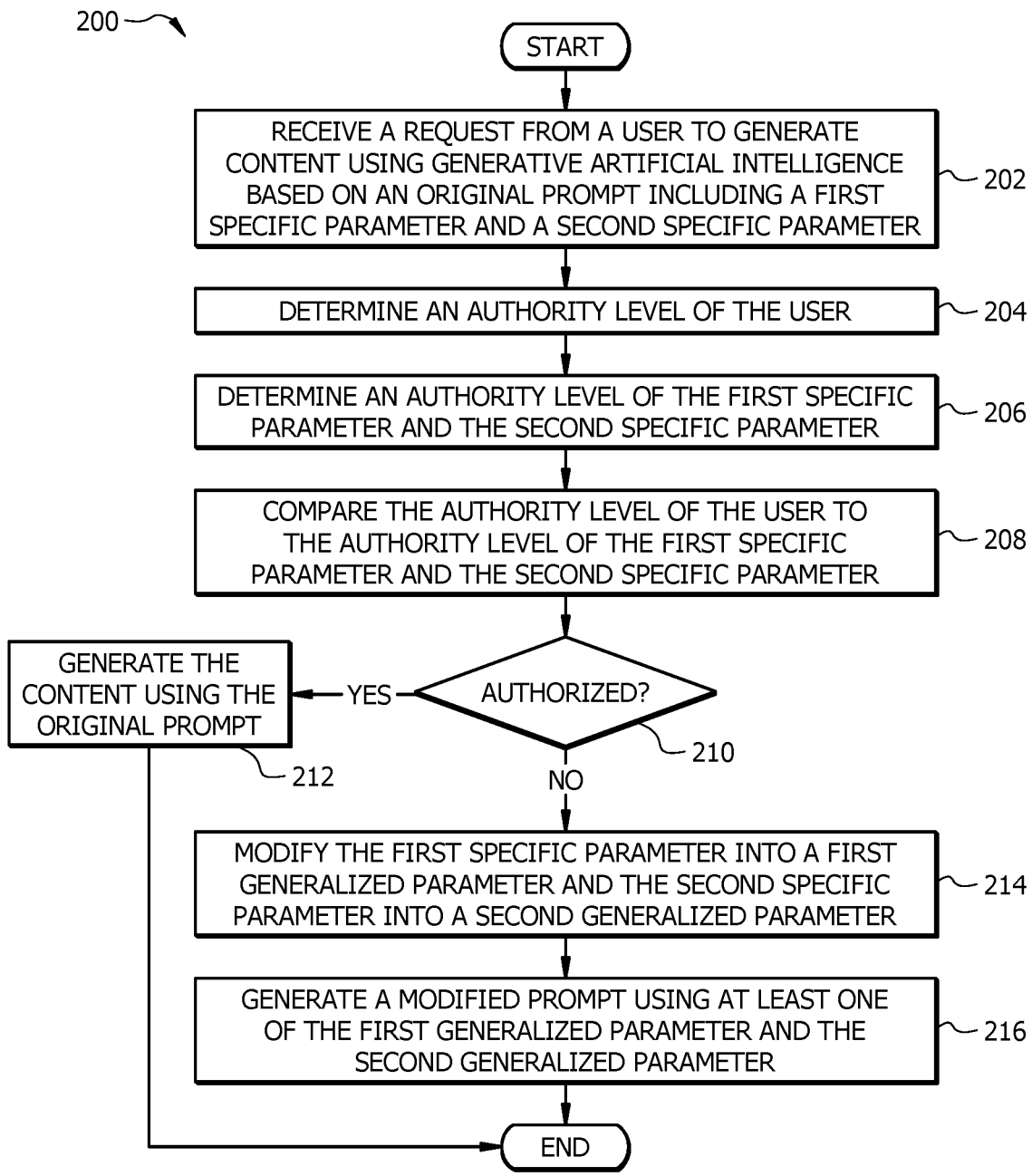
FIG. 2 illustrates a flowchart of one embodiment of a method of operating the system of FIG. 1.

FIG. 2 illustrates one embodiment of a flowchart 200 for regulating the content 102 generated from generative AI 150 based on an authority level 136 of one or more users 106*a*. The operational flow 200 can be logically described in two parts. The first part includes operations 202-208, which are generally directed to receiving a request from a user 106*a* to generate content 102 using generative AI 150 based on an original query having a first specific parameter 144 and a second specific parameter 146, determining an authority level 136 of the user 106*a*, determining an authority level 145 of the first specific parameter 144 and an authority level 147 of the second specific parameter 146, and comparing the authority level 136 of the user 106*a* to the authority levels 145, 147 of the first specific parameter 144 and the second specific parameter 146, respectively. The second part includes operations 210-218, which are generally directed to determining if whether the user 106*a* is authorized to access the first specific parameter 144 and the second specific parameter 146 based on the authority level 136 of the user 106*a*, modifying the first specific parameter 144 into a first generalized parameter 156 and the second specific parameter 146 into a second generalized parameter 158 if the user 106*a* is not authorized to access the authority levels 145, 147 of the first specific parameter 144 and the second specific parameter 146, and creating a modified prompt 154 to generate the content 102 using the generative AI 150 that obfuscates the content 102 of the original prompt 114 using the first generalized parameter 156 and the second generalized parameter 158.

In operation, the flow 200 may begin at operation 202 where the processor 128 of the entity server 110 communicates with the user device 104 to receive a request from the user 106*a* to generate content 102 using generative AI 150 based on an original prompt 114 provided by the user 106*a*. The original prompt 114 includes at least a first specific parameter 144 and a second specific parameter 146. Suitable specific parameters 144, 146 may include, but are not limited to, text (e.g., one or more words or word tokens), image data (e.g., captioned text associated with an image), an audio waveform (e.g., recorded music, speech, etc.), video data (e.g., captioned text associated with a video), and computer code (e.g., programming language text). In one exemplary use case, the original prompt 114 provided by the user 106 may be a query that asks "how many deals does the entity have in the pipeline, what companies and business divisions are included in those deals, and how many employees will be impacted?" In this exemplary use case, the first specific parameter 144 may be the first question of "how many deals does the entity have in the pipeline" and the second specific parameter 146 may be the second question of "what companies and business divisions are included in those deals?" The original prompt 114 may include any number of specific parameters. For example, the third specific parameter may be "how many employees will be impacted?"

At operation 204, the processor 128 determines the authority level 136 of the user 108*a* based at least in part upon information stored in the user profile 134. For example, the user 106*a* may log in to the user device 104 using a user ID 140 and the user ID 140 may be associated with an authority level 136 of the user 106*a* based on data in the user profile 134. In some embodiments, the authority level 136 of the user 106*a* indicates whether the user 106*a* is authorized to view the one or more specific parameters 144, 146. For example, the authority level 136 of the user 106*a* may depend on their respective job level within the entity. In some embodiments, an executive position will have a higher authority level 136, which allows the executive position to have the authority to access a greater number of specific parameters 144, 146 from the parameter profile 142 relative to an intermediate position or an entry position. That is, each of the intermediate position and the entry position may have a lower authority level 136 compared to the executive position (i.e., the intermediate position and entry position have the authority to access fewer specific parameters 144, 146 compared to the executive position).

In certain embodiments, the processor 128 may identify the authority level 136 of one or more users 106*a*, 106*b* using the camera 116. For example, the camera 116 may be configured to acquire an image of the first user 106*a* positioned in front of the user interface 118 and a second user 106*b* positioned in front of the user interface 118. The images may be communicated from the user device 104 to the processor 128 of the entity server 110. The processor 128 may compare facial data from the image of the user 106*a* and the image of the second user 106*b* to biometric data 138 stored in the user profile 134. Once a match is determined, the processor 128 may identify a user ID 140 associated with the first user 106*a* and a user ID 140 associated with the second user 106*b*. The processor 128 may then determine the authority level 136 of the first user 106*a* and the second user 106*b* using the user IDs 140, which may be associated with an authority level 136 of the respective user 106*a*, 106*b* based on data in the user profile 134.

At operation 206, the processor 128 is configured to determine an authority level 145 of the first specific parameter 144 and an authority level 147 of the second specific parameter 146. In some embodiments, the authority level 145 of the first specific parameter 144 and the authority level 147 of the second specific parameter 146 may be determined based upon information stored in the parameter profile 142. For example, the parameter profile 142 may be a database that stores authority levels for various words, word tokens, image data, audio waveforms, video data, and computer code within the entity server 110.

At operation 208, the processor 128 is configured to compare the authority level 136 of the user 106a to the authority level 145 of the first specific parameter 144. The processor 128 is further configured to compare the authority level 136 of the user 106a to the authority level 147 of the second specific parameter 146 to determine at decision block 210 if the user 106a is authorized to access the first specific parameter 144 and the second specific parameter 146 based on the authority level of the user 106a. In some embodiments, the authority level 136 of the user 106a and the authority level 145 of the specific parameter 146 may each have a respective numerical value. If the numerical value corresponding to the authority level 136 of the user 106a meets a threshold value then the user 106a is authorized to access the first specific parameter 144 or the second specific parameter 146. For example, if the numerical value for the authority level 136 of the user 106a is greater the numerical value for the authority level 145 of the first specific parameter 144, then the user 106a is authorized to access the first specific parameter 144. If the numerical value for the authority level 136 is lower than the numerical value for the authority level 145 of the first specific parameter 144, then the user 106a is not authorized to access the first specific parameter 144.

If it is determined at decision block 210 that the user 106a is authorized to access the first specific parameter 144 and the second specific parameter 146 then the processor 128 is configured to generate the content 102 using the original prompt 114 with the generative AI 150. Continuing with the example from above, the generative AI 150 may receive the original prompt 114 of "how many deals does the entity have in the pipeline, what companies and business divisions are included in those deals, and how many employees will be impacted?" Once the processor determines the user 106a is authorized, the generative AI 150 may generate the content 102 using the original prompt 114, where the content 102 includes "There are 14 deals in the pipeline, in the area of acquiring Starlin bank and their four business divisions including mortgage, card, insurance and wire businesses. The deal includes 3015 employee takeover and rebadging 2000 employees from the mortgage and card business divisions."

If it is determined at decision block 210 that the user 106a is not authorized to access the first specific parameter and/or the second specific parameter 146, then the operational flow 200 proceeds to operation 216. At operation 216, the processor 128 is configured to modify the first specific parameter 144 into a first generalized parameter 156 if the user 106a is not authorized to access the authority level 145 of the first specific parameter 144, and the processor 128 is configured modify the second specific parameter 146 into a second generalized parameter 158 if the user 106a is not authorized to access the authority level 147 of the second specific parameter 146. At operation 218, the processor 128 is configured to create a modified prompt 154 to generate the content 102 using the generative AI 150. In some embodiments, the modified prompt 154 obfuscates the content 102 of the original prompt 114 using the first generalized parameter 156 if the user 106a is not authorized to access the first specific parameter 144, and the modified prompt 154 obfuscates the content 102 of the original prompt 114 using the second generalized parameter 158 if the user 106a is not authorized to access the second specific parameter 146.

Continuing with the example from above, the processor 128 may determine that the user 106a is not authorized to access the first specific parameter 144 of "how many deals does the entity have in the pipeline?" The processor 128 may modify the first specific parameter 144 that is configured to generate content 102 comprising an exact number of items (e.g., number of deals) into a first generalized parameter 156 that is configured to generate content 102 that comprises an approximate number of items to obfuscate the original prompt 114. For example, the first generalized parameter 156 may be "approximately how many deals does the entity have in the pipeline." In some embodiments, the first generalized parameter 156 may include an exclusionary provision that is configured to obfuscate the content 102 the user 106a is not authorized to access. For example the first generalized parameter 156 may be "approximately how many deals does the entity have in the pipeline without specifying the exact number of deals?" The processor 128 may be further configured to generate content 102 using the modified prompt 154, which may include "there are a few deals in the pipeline."

The processor 128 may determine that the user 106a is not authorized to access the second specific parameter 146 of "what companies and business divisions are included in those deals?" The processor 128 may modify the second specific parameter 146 that is configured to generate content 102 comprising a specific name of an entity into a second generalized parameter 158 that is configured to generate content 102 that comprises a type of entity to obfuscate the original prompt 114. For example, the second generalized parameter 158 may be "what type of company and business divisions are included in those deals?" In some embodiments, the second generalized parameter 158 may include an exclusionary provision that is configured to obfuscate the content 102 the user 106a is not authorized to access. For example the second generalized parameter 158 may be "what type of company and business divisions are included in those deals without specifying the name of the company?" The processor 128 may be further configured to generate content 102 using the modified prompt 154, which may include "there are a few deals in the pipeline, in the area of acquiring a prominent bank and their four business divisions including mortgage, card, insurance and wire businesses."

The processor 128 may determine that the user 106a is not authorized to access the third specific parameter of "how many employees will be impacted?" The processor 128 may modify the third specific parameter into a third generalized parameter that is configured to obfuscate the content 102 of the original prompt. For example, the third generalized parameter may be "will employees be impacted?" In some embodiments, the third generalized parameter may include an exclusionary provision that is configured to obfuscate the content 102 the user 106a is not authorized to access. For example the third generalized parameter "will employees be impacted without specifying the number of employees?" The processor 128 may be further configured to generate content 102 using the modified prompt 154, which may include "there are a few deals in the pipeline, in the area of acquiring a prominent bank and their four business divisions including mortgage, card, insurance and wire businesses. The deal includes an employee takeover and rebadging a few employees from aligned businesses."

In another example, the content 102 generated from the original prompt 114 using a first specific parameter 144 and a second specific parameter 146 may produce a diagram. If it is determined that the user 106a is not authorized to access the first specific parameter 144 and the second specific parameter 146, then the processor 128 may generate a modified prompt 154 using a first generalized parameter 156 and a second generalized parameter 158 that generates content 102 having a diagram having fewer system components in the diagram relative to the diagram of the original prompt 114, fewer operational steps in the diagram relative to the diagram of the original prompt 114, at least one generalized system component relative to the diagram of the original prompt 114, and/or at least one generalized operational step relative to the original prompt.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory operably configured to store a user profile comprising an authority level of a user and a parameter profile comprising authority levels for a plurality of specific parameters; and
   a processor operably coupled to the memory and configured to:
      receive a request from the user to generate content using generative artificial intelligence based on an original prompt provided by the user, wherein the original prompt comprises a first specific parameter and a second specific parameter;
      determine the authority level of the user based at least in part upon information stored in the user profile of the user;
      determine an authority level of the first specific parameter based upon information stored in the parameter profile;
      determine an authority level of the second specific parameter based upon information stored in the parameter profile;
      compare the authority level of the first specific parameter and the authority level of the second specific parameter to the authority level of the user;
      determine whether the user is authorized to access the first specific parameter and the second specific parameter based on the authority level of the user;
      modify the first specific parameter into a first generalized parameter if the user is not authorized to access the authority level of the first specific parameter;
      modify the second specific parameter into a second generalized parameter if the user is not authorized to access the authority level of the second specific parameter; and
      create a modified prompt to generate the content using the generative artificial intelligence, wherein the modified prompt obfuscates the content of the original prompt using the first generalized parameter if the user is not authorized to access the first specific parameter, and wherein the modified prompt obfuscates the content of the original prompt using the second generalized parameter if the user is not authorized to access the second specific parameter.

2. The system of claim 1, wherein the processor is further configured to generate the content using the modified prompt.

3. The system of claim 1, wherein the user profile is stored in the memory as a non-fungible token.

4. The system of claim 1, wherein the content generated from the first specific parameter comprises an exact number of items and the content generated using the second generalized parameter comprises an approximate number of items.

5. The system of claim 1, wherein the content generated from the second specific parameter comprises a specific name of an entity and the second generalized parameter comprises a type of entity.

6. The system of claim 1, wherein the content generated using the modified prompt obfuscates the content of the original prompt to produce a diagram, wherein the diagram generated using the modified prompt relative to the original prompt comprises one or more of: fewer system components in the diagram, fewer operational steps in the diagram, at least one generalized system component, or at least one generalized operational step.

7. The system of claim 1, wherein the user comprises a first user and the system further comprises a camera configured to acquire an image of one or more users positioned in front of a display;
   wherein the processor is operably coupled to the camera and is further configured to:
      receive an image of the first user, where the first user is positioned in front of the display;
      receive an image of a second user, where the second user is positioned in front of the display;
      receive the request from the first user to generate the content using the generative artificial intelligence based on the original prompt provided by the first user, wherein the original prompt comprises the first specific parameter and the second specific parameter;
      determine the authority level of the first user;
      determine the authority level of the second user;
      compare the authority level of the first specific parameter and the second specific parameter to the authority level of the first user and the second user;
      determine the first user is authorized to access the first specific parameter and the second specific parameter and that the second user is not authorized to access the first specific parameter and the second specific parameter;
      modify the first specific parameter into the first generalized parameter;
      modify the second specific parameter into the second generalized parameter; and
      create the modified prompt to generate the content using the generative artificial intelligence, and wherein the modified prompt obfuscates the content of the original prompt using the first generalized parameter and the second generalized parameter.

8. A method comprising:

receiving a request from a user to generate content using generative artificial intelligence based on an original prompt provided by the user, wherein the original prompt comprises a first specific parameter and a second specific parameter;

determining an authority level of the user based at least in part upon information stored in a user profile of the user stored in a memory;

determining an authority level of the first specific parameter based upon information stored in a parameter profile stored in the memory;

comparing the authority level of the first specific parameter and the authority level of the second specific parameter to the authority level of the user;

determining whether the user is authorized to access the first specific parameter and the second specific parameter based on the authority level of the user;

modifying the first specific parameter into a first generalized parameter if the user is not authorized to access the authority level of the first specific parameter;

modifying the second specific parameter into a second generalized parameter if the user is not authorized to access the authority level of the second specific parameter; and creating a modified prompt to generate the content using the generative artificial intelligence, wherein the modified prompt obfuscates the content of the original prompt using the first generalized parameter if the user is not authorized to access the first specific parameter, and wherein the modified prompt obfuscates the content of the original prompt using the second generalized parameter if the user is not authorized to access the second specific parameter.

9. The method of claim 8 further comprising generating the content using the modified prompt.

10. The method of claim 8, wherein the user profile is stored in the memory as a non-fungible token.

11. The method of claim 8, wherein the content generated from the first specific parameter comprises an exact number of items and the content generated using the second generalized parameter comprises an approximate number of items.

12. The method of claim 8, wherein the content generated from the second specific parameter comprises a specific name of an entity and the second generalized parameter comprises a type of entity.

13. The method of claim 8, wherein the content generated using the modified prompt obfuscates the content of the original prompt to produce a diagram, wherein the diagram generated using the modified prompt relative to the original prompt comprises one or more of: fewer system components in the diagram, fewer operational steps in the diagram, at least one generalized system component, or at least one generalized operational step.

14. The method of claim 8, wherein the user comprises a first user and the method further comprises:

receiving an image of the first user, where the first user is positioned in front of a display;

receiving an image of a second user, where the second user is positioned in front of the display;

receiving a request from the first user to generate the content using the generative artificial intelligence based on the original prompt provided by the first user, wherein the original prompt comprises the first specific parameter and the second specific parameter;

determining the authority level of the first user;

determining the authority level of the second user;

comparing the authority level of the first specific parameter and the second specific parameter to the authority level of the first user and the second user;

determining the first user is authorized to access the first specific parameter and the second specific parameter and that the second user is not authorized to access the first specific parameter and the second specific parameter;

modifying the first specific parameter into the first generalized parameter;

modifying the second specific parameter into the second generalized parameter; and creating the modified prompt to generate the content using the generative artificial intelligence, and wherein the modified prompt obfuscates the content of the original prompt using the first generalized parameter and the second generalized parameter.

15. A non-transitory computer readable medium storing instruction that when executed by a processor cause the processor to:

receive a request from a user to generate content using generative artificial intelligence based on an original prompt provided by the user, wherein the original prompt comprises a first specific parameter and a second specific parameter;

determine an authority level of the user based at least in part upon information stored in a user profile of the user stored in a memory;

determine an authority level of the first specific parameter based upon information stored in a parameter profile stored in the memory;

determine an authority level of the second specific parameter based upon information stored in the parameter profile from the memory;

compare the authority level of the first specific parameter and the authority level of the second specific parameter to the authority level of the user;

determine whether the user is authorized to access the first specific parameter and the second specific parameter based on the authority level of the user;

modify the first specific parameter into a first generalized parameter if the user is not authorized to access the authority level of the first specific parameter;

modify the second specific parameter into a second generalized parameter if the user is not authorized to access the authority level of the second specific parameter; and create a modified prompt to generate the content using the generative artificial intelligence, wherein the modified prompt obfuscates the content of the original prompt using the first generalized parameter if the user is not authorized to access the first specific parameter, and wherein the modified prompt obfuscates the content of the original prompt using the second generalized parameter if the user is not authorized to access the second specific parameter.

16. The non-transitory computer readable medium of claim 15, wherein the user profile is stored in the memory as a non-fungible token.

17. The non-transitory computer readable medium of claim 15, wherein the instructions further cause the processor to generate the content using the modified prompt.

18. The non-transitory computer readable medium of claim 15, wherein the content generated from the first specific parameter comprises an exact number of items and the content generated using the second generalized parameter comprises an approximate number of items.

19. The non-transitory computer readable medium of claim 15, wherein the content generated from the second specific parameter comprises a specific name of an entity and the second generalized parameter comprises a type of entity.

20. The non-transitory computer readable medium of claim 15, wherein the content generated using the modified prompt obfuscates the content of the original prompt to produce a diagram, wherein the diagram generated using the modified prompt relative to the original prompt comprises one or more of: fewer system components in the diagram, fewer operational steps in the diagram, at least one generalized system component, or at least one generalized operational step.

* * * * *